B. CHAMBERS.
CANNON LOCK.
No. 237. Reissued Apr. 19, 1853.
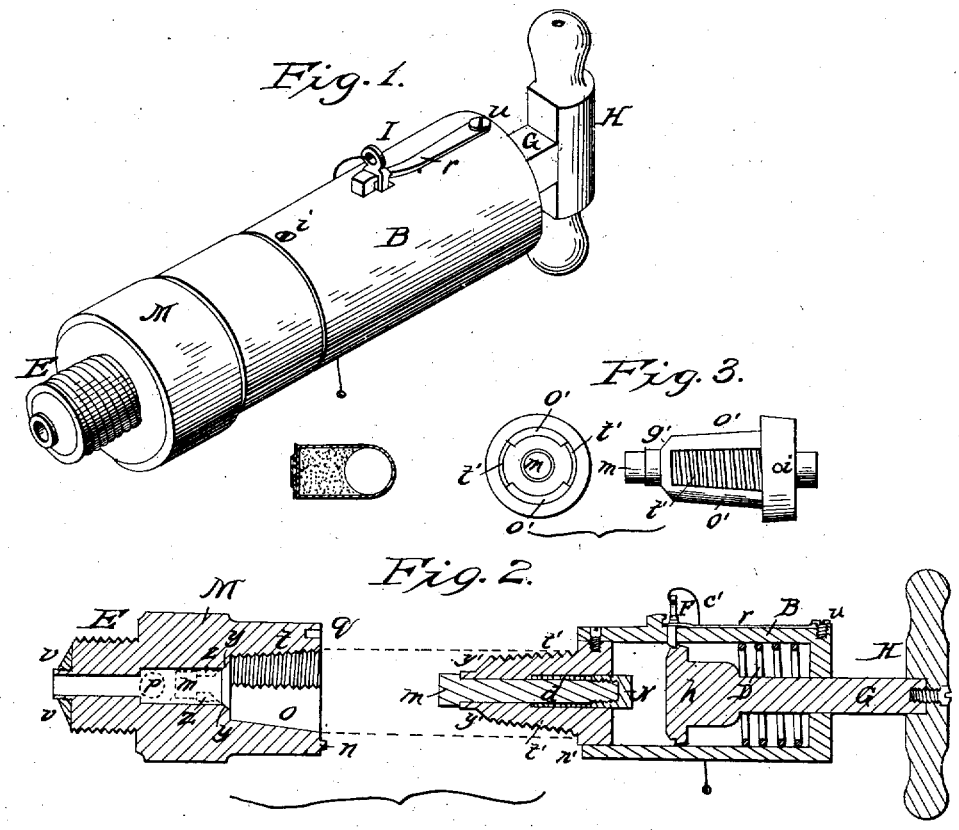
THE NORRIS PETERS CO., PHOTO-LITHO., WASHINGTON, D. C.

UNITED STATES PATENT OFFICE.

BENJAMIN CHAMBERS, OF WASHINGTON, DISTRICT OF COLUMBIA, ASSIGNOR TO JOANNA CHAMBERS.

IMPROVED CANNON-LOCK.

Specification forming part of Letters Patent No. 6,612, dated July 31, 1849; Reissue No. 237, dated April 19, 1853.

*To all whom it may concern:*

Be it known that I, BENJAMIN CHAMBERS, of Washington city, in the District of Columbia, have invented certain new and useful Improvements in Cannon-Locks and the Appurtenances thereof; and I do hereby declare the following to be a full, clear, and exact description of the same, reference being had to the accompanying drawings, which make a part of this specification.

The nature of my invention consists in forming upon the lock or the pin or piece to which the lock is attached the sectional or quarter screws, male and female, for the purpose of speedily removing the lock to supply it with the cap, pellet, or other material by which the gunpowder is ignited, and of firmly holding the same in place on the gun when it is to be discharged; also, forming the gun-lock in such manner that the hammer-rod and the percussion-rod shall be in separate pieces, lying axially within the same barrel, whereby the coiled mainspring is made to urge the hammer-rod against the head of the percussion-rod to discharge the piece, and the recoil-spring on the percussion-rod is made immediately to draw back and hold the valve which closes the interior of the lock against access of smoke or gases.

To enable others skilled in the art to make and use my invention, I will proceed to describe the same with reference to the drawings, in which—

B represents the barrel of the lock, and M the detached piece or pin, which has a screw, E, cut on its end, for the purpose of attaching it to the gun. When applied to guns of the ordinary construction, the touch-hole may be simply enlarged and a female screw cut therein, into which the screw E may fit. On the end of the barrel B, which may be of a conical form, I cut a dissected or quarter male screw, $t'$, the threads of which fit into a similarly cut or dissected female screw, $t$, in the pin or piece M, so that after each discharge the giving of a quarter-turn to the lock or barrel B enables the screw $t'$ to be lifted out of M, in order that the latter may eceive a fresh pellet or cap, after which, by inserting the part B in place and drawing up or out the handle H, the lock is ready for a fresh discharge. Within the piece or pin M are the dissected female screw $t$, valve-seat $y$, and the shoulder for lodging the pellet of percussion-powder, $p$, or cap, if used. On one side is the projecting stop $n$, to pass into a corresponding cavity, $n'$, on or in the barrel B, and prevent its being inserted in a wrong position. When the handle H is drawn up or back, (for the lock may be used in connection with a breech-loading gun or otherwise,) so as to compress the spring D and raise the hammer $h$ above the trigger F, the point of the trigger is pressed either by the hand or by a spring, $r$, Fig. 2, into the space below the hammer, which may or may not have a notch, $x$, to receive its point. In Fig. 2, $h$ is seen elevated, or the gun or lock is cocked.

The dotted lines in M, Fig. 2, represent the position of the hammer $m$ when the barrel B is inserted in its place and ready to act. The vent of the gun is kept closed against the exit of any of the products of explosion by the conical part $v$ resting on a corresponding seat at the bottom of the cavity cut for the screw E, and $y'$ on the barrel B in like manner makes with $y$ a valve-joint similar to that formed in Figs. 4 and 5 by $u$ and $u'$.

$d$, Fig. 2, represents a spring coiled around the percussion-rod $m$, the recoil of which spring, when the rod is driven forward by the hammer $h'$ to discharge the gun, brings the rod back and closes the interior of the lock against access of smoke and gases.

When the lock is used with a breech-loading gun, it may be so hung to the hinged or removable piece which, when closed up, forms the breech, as to swing back with it, and the pellet or cap can be furnished to the lock at the same time that the cartridge is furnished to the gun. Each separate or different method of connecting the lock to differently-constructed guns may require some slight modifications of its construction, not, however, involving the principle of its operation, and I claim its use, however applied, so long as I retain the general construction of the same as herein set forth.

Having thus fully described the nature of my invention, what I claim therein as new, and desire to secure by Letters Patent, is—

1. The method of securing the lock to the gun by means of the sectional or quarter screws *t t'*, for the purpose of speedily opening or removing the lock to supply it with the cap, pellet, or other material by which the gunpowder is ignited, and for firmly holding the same in place on the gun when it is to be discharged, substantially as herein described.

2. Forming the gun-lock in such a manner that the hammer-rod and the percussion-rod shall be in separate pieces lying axially within the same barrel, whereby the coiled mainspring is made to urge the hammer-rod against the head of the percussion-rod to discharge the piece, and the recoil-spring on the percussion-rod is made immediately to draw back and hold the valve, which closes the interior of the lock against access of smoke and gases, as herein set forth.

B. CHAMBERS.

Witnesses:
A. B. STOUGHTON,
SAML. GRUBB.